US012362482B2

(12) United States Patent
Ren et al.

(10) Patent No.: US 12,362,482 B2
(45) Date of Patent: Jul. 15, 2025

(54) ANTENNA SUBARRAY AND BASE STATION ANTENNA

(71) Applicant: HUAWEI TECHNOLOGIES CO., LTD., Shenzhen (CN)

(72) Inventors: Chao Ren, Dongguan (CN); Dingjiu Daojian, Dongguan (CN); Weihong Xiao, Dongguan (CN); Guoqing Xie, Dongguan (CN); Jian Song, Dongguan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 140 days.

(21) Appl. No.: 18/324,698

(22) Filed: May 26, 2023

(65) Prior Publication Data

US 2023/0299486 A1 Sep. 21, 2023

Related U.S. Application Data

(63) Continuation of application No. PCT/CN2020/132760, filed on Nov. 30, 2020.

(51) Int. Cl.
*H01Q 5/48* (2015.01)
*H01Q 1/24* (2006.01)
*H01Q 1/40* (2006.01)

(52) U.S. Cl.
CPC ............... *H01Q 5/48* (2015.01); *H01Q 1/246* (2013.01); *H01Q 1/405* (2013.01)

(58) Field of Classification Search
CPC .......... H01Q 1/24; H01Q 1/246; H01Q 1/405; H01Q 1/42; H01Q 5/48; H01Q 19/108; H01Q 21/0075; H01Q 21/08; H01Q 21/26
See application file for complete search history.

(56) References Cited

U.S. PATENT DOCUMENTS

| | | | | |
|---|---|---|---|---|
| 6,034,649 | A * | 3/2000 | Wilson | H01Q 9/28 343/797 |
| 6,717,555 | B2 | 4/2004 | Teillet et al. | |
| 9,397,404 | B1 | 7/2016 | McDevitt et al. | |

(Continued)

FOREIGN PATENT DOCUMENTS

| | | |
|---|---|---|
| CN | 101834345 A | 9/2010 |
| CN | 102800965 A | 11/2012 |

(Continued)

*Primary Examiner* — Hoang V Nguyen

(74) *Attorney, Agent, or Firm* — Leydig, Voit & Mayer, Ltd.

(57) ABSTRACT

An antenna subarray and a base station antenna are disclosed. The antenna subarray includes a reflection plate, a plurality of radiation surfaces, and a ground plate of the plurality of radiation surfaces. The ground plate is vertically disposed on the reflection plate, and includes an integrated bottom end structure and a plurality of branch structures. The bottom end structure is connected to the reflection plate, and a top end of a branch structure is connected to a radiation surface. A feeder layer is disposed on a side of the ground plate, and a dielectric layer is spaced between the ground plate and the feeder layer. A first polarized feeder and a second polarized feeder are disposed on the feeder layer. The ground plate may have both a "ground" function of a polarized feeder and a "ground" function of a balun. The first polarized feeder and the second polarized feeder can implement both a function of a polarized feeder of the radiation surface and a function of a balun feeder.

11 Claims, 6 Drawing Sheets

(56) References Cited

U.S. PATENT DOCUMENTS

| | | | |
|---|---|---|---|
| 2010/0309084 | A1 | 12/2010 | Bu et al. |
| 2016/0134023 | A1 | 5/2016 | Liu |

FOREIGN PATENT DOCUMENTS

| | | | | | |
|---|---|---|---|---|---|
| CN | 209526204 | U | | 10/2019 | |
| CN | 211045708 | U | * | 7/2020 | ............... H01Q 1/24 |

* cited by examiner

ANTENNA SUBARRAY AND BASE STATION ANTENNA

CROSS-REFERENCE TO RELATED APPLICATIONS

This application is a continuation of International Application No. PCT/CN2020/132760, filed on Nov. 30, 2020, the disclosure of which is hereby incorporated by reference in its entirety.

TECHNICAL FIELD

This application relates to the field of antenna technologies, and in particular, to an antenna subarray and a base station antenna.

BACKGROUND

With rapid development of wireless communication technologies, a requirement for a capacity of a communication system is increasing. In this case, a multiple-input multiple-output (MIMO) technology and a beamforming array antenna emerge. A conventional base station antenna implements real-time variable network coverage through an electrical connection between radiating elements and a feeding network, to meet ever-changing coverage scenarios. This enhances network performance.

However, in a current technology, a structure of a base station antenna is complex, increasing complexity of installing components. For example, referring to FIG. 1A, in an implementation, a base station antenna includes a first dielectric substrate (1), a first upper metal layer (2), a second lower metal layer (3), a metal reflection plate (4), a balun (5) combining dielectric substrates, and nylon plastic cylinders (6). The dielectric substrates are supported on the metal reflection plate (4) by at least four nylon plastic cylinders (6). The first dielectric substrate (1) is fed by the balun (5) combining dielectric substrates. The first upper metal layer (2) and the second lower metal layer (3) are respectively printed on an upper surface and a lower surface of the first dielectric substrate (1). Two cross dipole antennas are respectively printed on the first upper metal layer (2) and the second lower metal layer (3). The balun (5) combining dielectric substrates includes a balun upper metal layer, a balun middle metal layer, and a balun lower metal layer. A second dielectric plate is disposed between the balun upper metal layer and the balun middle metal layer, and a second dielectric plate is disposed between the balun middle metal layer and the balun lower metal layer. Referring to FIG. 1B, the balun upper metal layer includes a first gradient line (9) and two first balun metal grounds (8), the balun middle metal layer includes a balun feeder (10), and the balun lower metal layer includes a second gradient line (12) and two second balun metal grounds (11).

In the current technology, a balun structure is complex, and the combined balun is implemented through pinning. The structure is complex, and installation is difficult. In addition, the dipole antennas are supported on the metal reflection plate via a plurality of separate nylon plastic cylinders (6). This also increases difficulty of the installation. Therefore, a simpler base station antenna is urgently to be developed.

SUMMARY

According to a first aspect, an embodiment of this application provides an antenna subarray, including a reflection plate, a plurality of radiation surfaces, and a ground plate of the plurality of radiation surfaces. The ground plate is vertically disposed on the reflection plate, and includes an integrated bottom end structure and a plurality of branch structures. The bottom end structure is connected to the reflection plate, and a top end of a branch structure is connected to a radiation surface. A feeder layer is disposed on a side of the ground plate, and a dielectric layer is disposed between the ground plate and the feeder layer. A first polarized feeder and a second polarized feeder are disposed on the feeder layer. The radiation surface includes a first electric dipole and a second electric dipole that are disposed in a cross manner. The first polarized feeder is connected to the first electric dipole, and the second polarized feeder is connected to the second electric dipole.

In this example, the ground plate may have functions of two components at the same time. To be specific, the ground plate may have both a "ground" function of a polarized feeder and a "ground" function of a balun of a radiating element. It may be understood that the ground plate includes the integrated bottom end structure and the plurality of branch structures, and the plurality of branch structures are connected to the plurality of radiation surfaces and support the plurality of radiation surfaces. The top end of each branch structure is connected to the radiation surface, and the branch structure can implement both the "ground" function of the polarized feeder and the "ground" function of the balun. In addition, the first polarized feeder and the second polarized feeder are disposed on the side of the ground plate. The first polarized feeder and the second polarized feeder can implement both a function of the polarized feeder of the radiation surface and a function of a balun feeder. Integration between a feeding network and a balun of an antenna is implemented via the ground plate, the first polarized feeder, and the second polarized feeder in this example. Compared with a current technology, a structure of a base station antenna in this example is simple, and a function of the base station antenna is implemented using few components. This simplifies installation and reduces production costs.

In an embodiment, the feeder layer includes a first feeder layer and a second feeder layer, and the dielectric layer includes a first dielectric layer and a second dielectric layer. The first feeder layer is disposed on one side of the ground plate, and is configured to dispose the first polarized feeder. The first feeder layer is processed into the first polarized feeder in a processing manner. That is, the first feeder layer is the first polarized feeder. The second feeder layer is disposed on another side of the ground plate, and is configured to dispose the second polarized feeder. The second feeder layer is processed into the second polarized feeder in a processing manner. That is, the second feeder layer is the second polarized feeder.

In this example, the first polarized feeder and the second polarized feeder are respectively located on two sides of the ground plate. In addition, the dielectric layer is disposed between the following three metal layers: the ground plate, the first feeder layer (the first polarized feeder), and the second feeder layer (the second polarized feeder). A structure of the antenna subarray in which the feeding network and the balun are integrated is implemented via the three metal layers, which are the two feeder layers and the ground layer. The structure is simple and the installation is convenient.

In an embodiment, the ground plate, the first polarized feeder, and the second polarized feeder are all sheet metal parts.

In this example, a structure in which the feeding network and the balun that are of the base station antenna are integrated is implemented via the three layers of sheet metal parts. The structure is simple and the installation is convenient. In addition, from the perspective of the production costs, a method of using the sheet metal parts as the ground plate and the polarized feeder may reduce the production costs of the base station antenna.

In an embodiment, the dielectric layer is an air dielectric layer, a dielectric layer between the ground plate and the first feeder layer is a first air dielectric layer, and a dielectric layer between the ground plate and the second feeder layer is a second air dielectric layer.

In this example, an air microstrip is formed via the three layers of sheet metal parts and the air dielectric layer, and a dielectric layer in the air microstrip is air. Therefore, a dielectric loss can be greatly reduced.

In an embodiment, the first feeder layer is a signal layer of a first PCB, and the second feeder layer is a signal layer of a second PCB. The ground plate includes a ground layer of the first PCB and a ground layer of the second PCB.

In this example, the ground layer of the first PCB and the ground layer of the second PCB jointly implement a function of a “common ground”. To be specific, the ground layers of the two PCBs can implement both the “ground” function of the polarized feeder and the “ground” function of the balun of the radiating element. The first polarized feeder may be deployed at the signal layer of the first PCB, and the second polarized feeder may be deployed at the signal layer of the second PCB. In other words, the first polarized feeder and the second polarized feeder are respectively located on two sides of the “common ground”. The first polarized feeder and the second polarized feeder may not only serve as feeders of the radiation surface to feed the radiation surface, but also implement the function of the balun feeder. This can balance feeding to a plurality of radiating elements. In this example, the structure in which the feeding network and the balun that are of the base station antenna are integrated is implemented by using a structure of two PCBs. The structure is simple and the installation is convenient.

In an embodiment, the first dielectric layer is a dielectric layer of the first PCB, and the second dielectric layer is a dielectric layer of the second PCB.

In this example, the PCB structure is used to implement a structure of the “common ground”, the first polarized feeder, the second polarized feeder, and the dielectric layer. Therefore, advantages such as convenient processing and lightweight are implemented.

In an embodiment, the feeder layer is disposed on a same side of the ground plate. The ground plate is a ground layer of a PCB, the feeder layer is a signal layer of the PCB, and the dielectric layer is a dielectric layer of the PCB. A first via and a second via are disposed on the PCB. A window is disposed in a position that is on the ground layer of the PCB and that corresponds to the first via and the second via. A distance between the first via and the second via is greater than or equal to a width of the first polarized feeder. The second polarized feeder includes a jumper section, and the jumper section passing through the first via and the second via is located in the position of the window.

In this example, the ground layer of the PCB is configured to implement the function of the “common ground”, and can implement both the “ground” function of the polarized feeder and the “ground” function of the balun of the radiating element. The first polarized feeder and the second polarized feeder can implement both the function of the feeder of the radiation surface and the function of the balun feeder. In this example, to avoid an electrical connection between the first polarized feeder and the second polarized feeder, the first polarized feeder and the second polarized feeder may be disposed on the same side of the ground plate in a manner of cross jumpers. Therefore, the structure in which the feeding network and the balun are integrated is implemented, the structure of the base station antenna is simple, and the installation is convenient. In this example, the PCB structure is used to implement a structure of the “common ground”, the first polarized feeder, and the second polarized feeder. Therefore, advantages such as convenient processing and lightweight are implemented.

In an embodiment, the radiation surface includes four ring structures. A first ring structure and a third ring structure thereof are first electric dipoles, and a second ring structure and a fourth ring structure thereof are second electric dipoles.

In this example, each ring structure is a radiation arm of the radiation surface, and the radiation arm of the radiation surface is implemented by using the ring structure. An induced current on the radiation arm is symmetric around a center of an element, and there is no potential difference between two feeds of the element. This implements high isolation.

In an embodiment, the radiation surface is a sheet metal part, or the radiation surface is a PCB structure. In this example, when the radiation surface is the sheet metal part, costs of the antenna subarray can be reduced, the structure is stable, and a service life is long. When the radiation surface is the PCB structure, advantages such as convenient processing and lightweight are implemented.

According to a second aspect, an embodiment of this application provides a base station antenna, including a radome, and the radome includes a plurality of antenna subarrays according to the first aspect.

DESCRIPTION OF EMBODIMENTS

The following clearly and completely describes the technical solutions in embodiments of the present invention with reference to the accompanying drawings in embodiments of the present invention. It is clear that the described embodiments are merely a part rather than all of embodiments of the present invention. In the specification, claims, and accompanying drawings of this application, the terms "first", "second", and so on are intended to distinguish between similar objects but do not necessarily indicate a specific order or sequence. It should be understood that the terms used in such a way are interchangeable in appropriate circumstances, so that embodiments of the present invention described herein can be implemented in other orders than the order illustrated or described herein. Moreover, the terms "include", "have", and any other variants thereof are intended to cover non-exclusive inclusion. The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects. In this application, "a plurality of" means two or more than two.

Figure 1A:
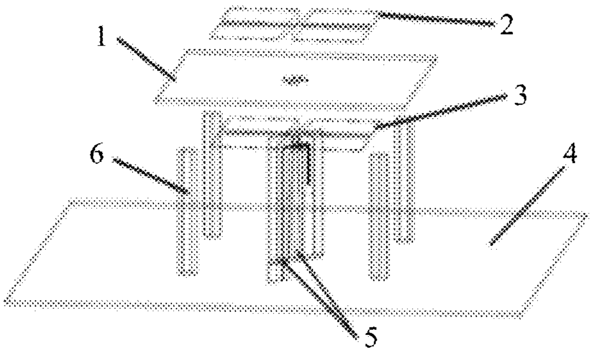
FIG. 1A and FIG. 1B each are a schematic diagram of an example of a base station antenna in a conventional method.
Figure 1B:
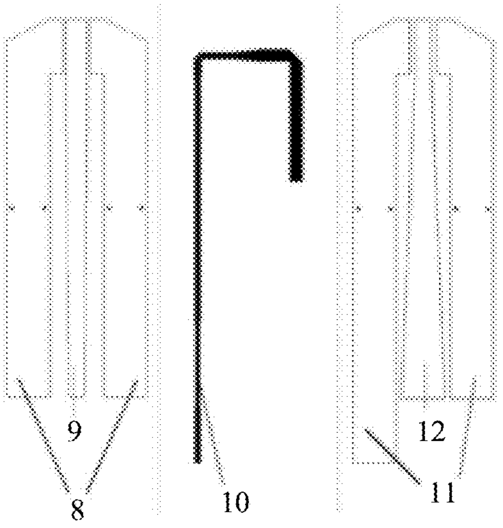
Figure 2:
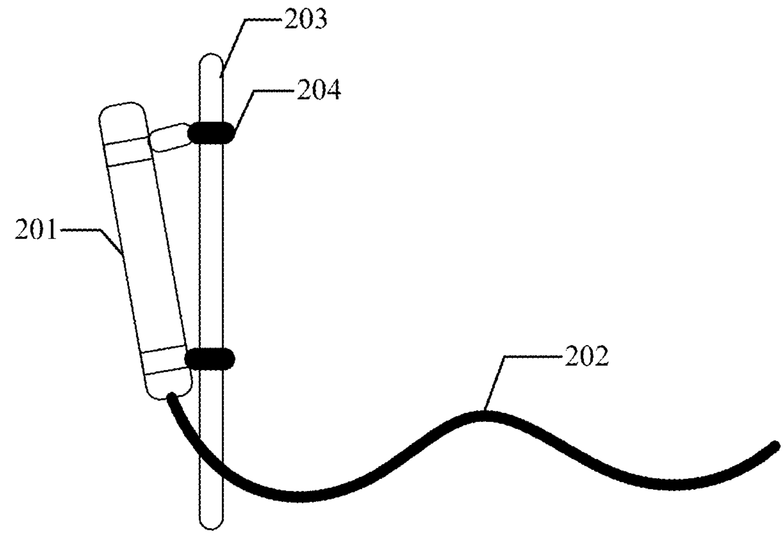
FIG. 2 is a schematic diagram of an example of a base station antenna feeder system according to an embodiment of this application.

This application provides an antenna subarray, and the antenna subarray is used in a base station antenna feeder system. Referring to FIG. 2, the base station antenna feeder system includes a base station antenna 201, a feeder system 202, a pole 203, an antenna adjustment support 204, and the like. The base station antenna 201 is configured to receive and send radio signals, and the base station antenna 201 is a dual-polarized antenna. The feeder system 202 is a conducting wire system that transmits signals between a sending device and a base station antenna. The pole 203 is configured to fix the base station antenna 201. The antenna adjustment support 204 is configured to adjust an angle of the base station antenna 201.

Figure 3:
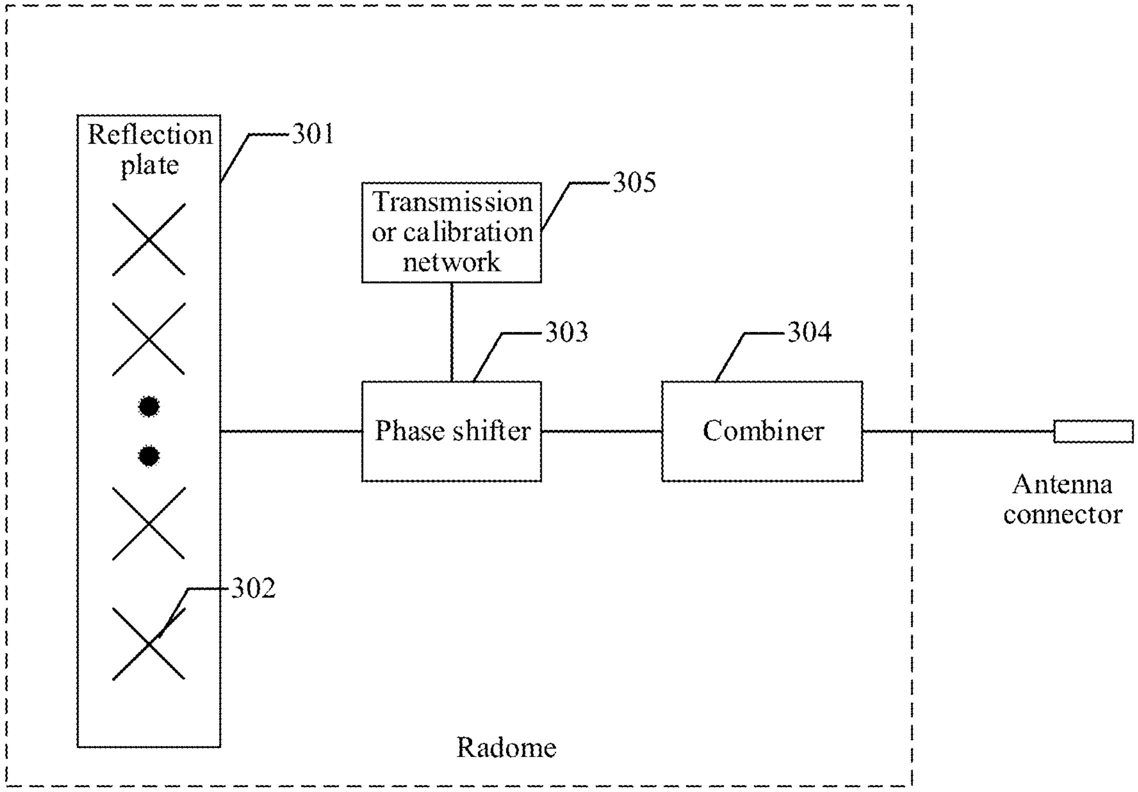
FIG. 3 is a schematic structural diagram of components inside a radome according to an embodiment of this application.

Referring to FIG. 3, a base station antenna includes a radome. An antenna subarray is disposed in the radome, and the antenna subarray includes a reflection plate 301 and a plurality of radiation surfaces 302 disposed on the reflection plate 301. Optionally, the radome may further include a phase shifter 303, a combiner 304 (or a filter), and a transmission or calibration network 305. The radome is configured to protect a component inside the radome from being affected by an external environment. In addition, the radome has a good electromagnetic wave penetration characteristic in terms of electrical performance, and can withstand an external harsh environment in terms of mechanical performance. The phase shifter 303 may be configured to control a change of a signal phase. The phase shifter 303 may perform phase shift on an input signal to change a relative phase between signals, and ensure that the signal can be smoothly transmitted inside the base station antenna. The combiner 304 is a radio frequency device configured to combine two or more signals of different frequency band standards, and is connected to an antenna connector. The transmission or calibration network 305 is configured to ensure that phases and attenuation generated by a signal passing through each path are consistent. Therefore, it is ensured that beamforming formed by processing a baseband signal can be accurately distributed to a radiation surface 302 of the antenna. In this application, the phase shifter 303, the combiner 304, and the transmission or calibration network 305 are not described in detail. The following describes the antenna subarray by using an embodiment.

In this application, the radome includes a reflection plate, a plurality of radiation surfaces, and a ground plate of the plurality of radiation surfaces. The ground plate is vertically disposed on the reflection plate, and includes an integrated bottom end structure and a plurality of branch structures. The bottom end structure is connected to the reflection plate, and a top end of a branch structure is connected to a radiation surface. A feeder layer is disposed on a side of the ground plate, and a dielectric layer is spaced between the ground plate and the feeder layer. A first polarized feeder and a second polarized feeder are disposed on the feeder layer. Each radiation surface includes a first electric dipole and a second electric dipole that are disposed in a cross manner. The first polarized feeder is connected to the first electric dipole, and feeds the first electric dipole. The second polarized feeder is connected to the second electric dipole, and feeds the first electric dipole.

In this application, the ground plate may also be referred to as a "common ground plate" or a "common ground". The ground plate may be referred to as the "common ground" because the ground plate may have functions of two components at the same time. To be specific, the ground plate may have both a "ground" function of a polarized feeder and a "ground" function of a balun of a radiating element. It may be understood that the ground plate includes the integrated bottom end structure and the plurality of branch structures, and the plurality of branch structures are connected to the plurality of radiation surfaces and support the plurality of radiation surfaces. The top end of each branch structure is connected to the radiation surface, and the branch structure can implement both the "ground" function of the polarized feeder and the "ground" function of the balun. In addition, the first polarized feeder and the second polarized feeder are disposed on the side of the ground plate. The first polarized feeder and the second polarized feeder can implement both a function of the polarized feeder of the radiation surface and a function of a balun feeder. Integration between a feeding network and a balun of an antenna is implemented using the ground plate, the first polarized feeder, and the second polarized feeder in this application. Compared with a current technology, a structure of the antenna subarray in this application is simple, and a function of the base station antenna is implemented using few components. This simplifies installation and reduces production costs.

To better understand this application, terms in this application are first described.

A radiating element may also be referred to as an "antenna element", an "element", or the like. The radiating element is a basic structural unit of an antenna array, and can effectively radiate or receive radio waves. The radiating element includes a radiation surface and a balun.

A reflection plate may also be referred to as a "bottom plate", an "antenna panel", a "metal reflective surface", or the like. The reflection plate is configured to improve receiver sensitivity of antenna signals, and reflect and concentrate the antenna signals at a receiving point. The reflection plate may not only enhance a receiving or transmitting capability of the antenna, but also block and shield interference of another radio wave from the back (reverse direction) to the received signals.

A feeding network is configured to feed a signal to the radiating element based on a specific amplitude and a specific phase, or send a received radio signal to a signal processing unit of a base station based on a specific amplitude and a specific phase. The feeding network usually includes a controlled impedance transmission line.

The balun is configured to implement balanced feeding to the radiating element, and may further support the radiation surface.

Sheet metal part: sheet metal is a comprehensive cold processing technology, for example, including shearing, punching, cutting, folding, or the like, for a metal sheet (which is usually less than 6 mm). The sheet metal part is a metal part processed in a sheet metal manner. The metal part may be a copper sheet metal part, an aluminum sheet metal part, or the like. This is not specifically limited.

The ground plate is "vertically" disposed on the reflection plate, and includes a front surface, a rear surface and four side surfaces. One side surface of the ground plate is used as a bottom surface, the side surface of the ground plate is connected to the reflection plate, and the ground plate is perpendicular to the reflection plate.

In this application, the feeder layer is disposed on the side of the ground plate. In a possible implementation, the feeder layer is disposed on two sides of the ground plate. To be specific, a first feeder layer is disposed on one side of the ground plate, and a second feeder layer may be disposed on another side of the ground plate. The first feeder layer is configured to dispose the first polarized feeder, and the second feeder layer is configured to dispose the second polarized feeder. In addition, the dielectric layer is disposed between three metal layers: the ground plate, the first feeder layer (the first polarized feeder), and the second feeder layer (the second polarized feeder). A structure of the antenna subarray in which the feeding network and the balun are integrated is implemented via the three metal layers, which are the two feeder layers and the ground layer. For details about this implementation, refer to the following Embodiment 1. In another implementation, the feeder layer is disposed on a same side of the ground plate. To be specific, both the first polarized feeder and the second polarized feeder are disposed on the feeder layer. A structure of the base station antenna in which the feeding network and the balun are integrated is implemented via the two metal layers, which are the ground layer and the feeder layer. For details about this implementation, refer to the following Embodiment 2.

Embodiment 1

Figure 4:
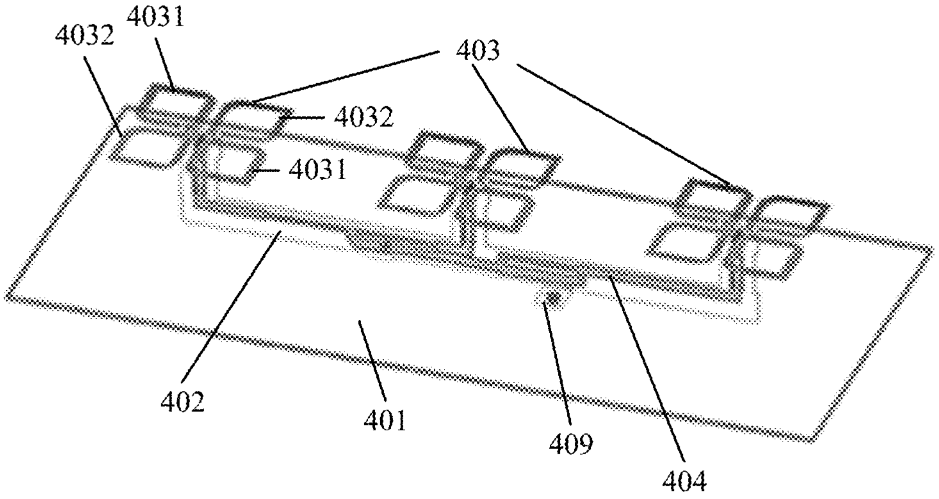
FIG. 4 is a schematic diagram of a three-dimensional structure of an example of an antenna subarray according to an embodiment of this application.
Figure 5:
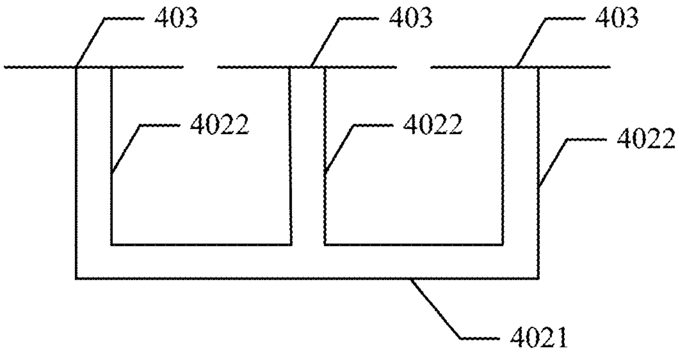
FIG. 5 is a schematic structural diagram of a front view of an example of a bottom end structure of a ground plate and a plurality of branch structures according to an embodiment of this application.

Embodiments of this application provide an embodiment of an antenna subarray. Referring to FIG. 4 and FIG. 5, a base station antenna includes a reflection plate 401, a plurality of radiation surfaces 403, and a ground plate 402 (which may also be referred to as a "common ground", or a "common ground plate"). The ground plate 402 is vertically disposed on the reflection plate 401. The ground plate 402 includes an integrated bottom end structure 4021 and a plurality of branch structures 4022. The bottom end structure 4021 may be connected to the reflection plate 401 via a screw 409. A top end of a branch structure 4022 is connected to a radiation surface 403, and the top end of each branch structure 4022 is connected to one radiation surface 403. A feeder layer is disposed on two sides of the ground plate 402, the feeder layer includes a first feeder layer and a second feeder layer, and a dielectric layer includes a first dielectric layer and a second dielectric layer. The first feeder layer is disposed on one side of the ground plate 402, and is configured to dispose a first polarized feeder 404. For example, the first polarized feeder 404 is a +45° polarized feeder. The second feeder layer is disposed on another side of the ground plate 402, and is configured to dispose a second polarized feeder. For example, the second polarized feeder is a −45° polarized feeder. Each radiation surface 403 includes a first electric dipole 4031 (for example, a +45° electric dipole) and a second electric dipole 4032 (for example, a −45° electric dipole) that are disposed in a cross manner. The first polarized feeder 404 is connected to the first electric dipole 4031, and the second polarized feeder is connected to the second electric dipole 4032.

Figure 6A:
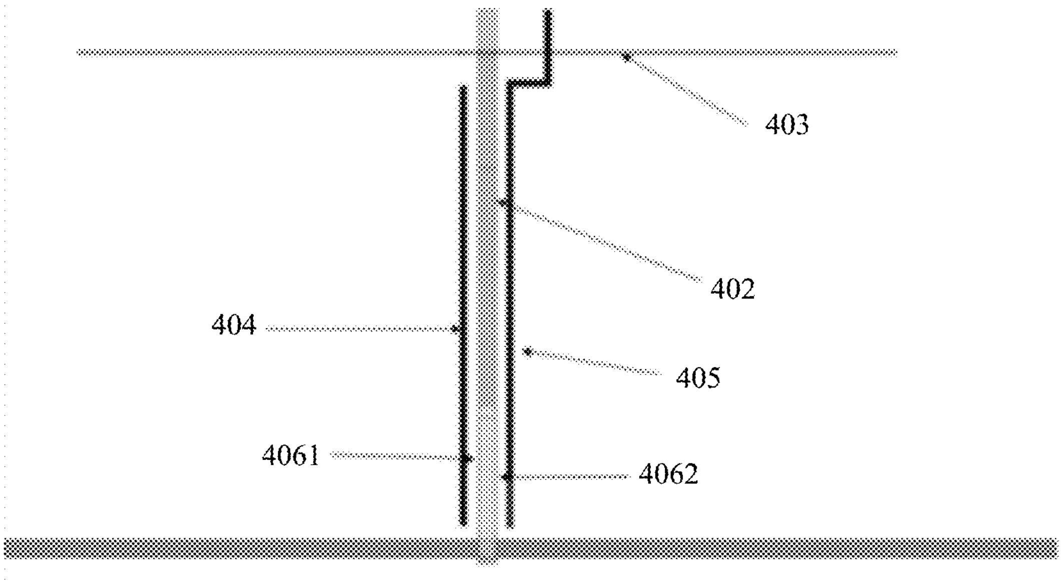
FIG. 6A is a schematic structural diagram of a side view of an example of an antenna subarray according to an embodiment of this application.
Figure 6B:
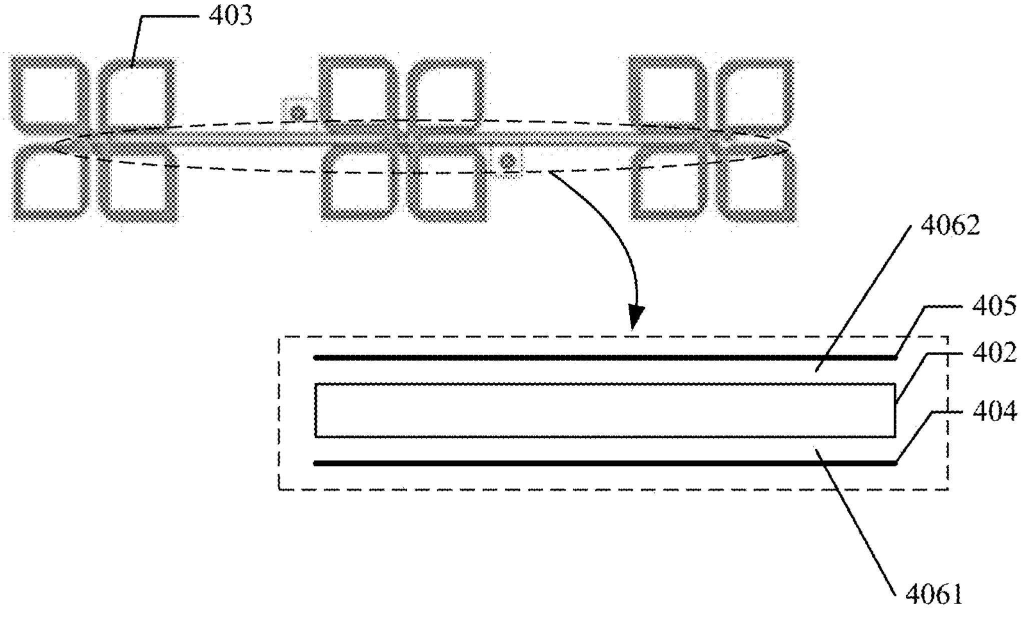
FIG. 6B is a schematic structural diagram of a top view of an example of an antenna subarray according to an embodiment of this application.

Referring to FIG. 6A and FIG. 6B, in an embodiment, the dielectric layer is an air dielectric layer, a dielectric layer between the ground plate 402 and the first feeder layer is a first air dielectric layer 4061, and a dielectric layer between the ground plate 402 and the second feeder layer is a second air dielectric layer 4062. In other words, one side of the ground plate 402 is the first polarized feeder 404, and another side of the ground plate 402 is the second polarized feeder 405. The ground plate 402, the first polarized feeder 404, and the second polarized feeder 405 may all be sheet metal parts. It may be understood that, in this application, the first feeder layer is processed into the first polarized feeder by using a sheet metal processing technology, so that the first feeder layer is the first polarized feeder. Similarly, the second feeder layer is processed into the second polarized feeder by using the processing technology, so that the second feeder layer is the second polarized feeder.

In this example, first, the ground plate includes the integrated bottom end structure and the plurality of branch structures, and the integrated structure is easy to process. Each branch structure is connected to the radiation surface, and the plurality of radiation surfaces are connected via the plurality of branch structures. The branch structure may not only support the radiation surface, but also serve as a "ground" of a balun. In addition, the ground plate serves as a "ground" of a polarized feeder. In other words, the ground plate may be regarded as a "common ground" of the polarized feeder and the balun. Then, the first polarized feeder and the second polarized feeder may not only serve as feeders of the radiation surface to feed the radiation surface, but also implement a function of a balun feeder. This can balance feeding to a plurality of radiating elements. In this example, a structure in which a feeding network and the balun that are of the base station antenna are integrated is implemented via three metal layers (for example, the sheet metal parts). The structure is simple and installation is convenient. Finally, an air microstrip is formed via the three layers of sheet metal parts and the air dielectric layer, and a dielectric layer in the air microstrip is air. Therefore, a dielectric loss can be greatly reduced. In addition, from the perspective of production costs, the implementation of the sheet metal part is lower than that of a PCB, a cable, or a plus etched pattern (plus etched pattern, PEP). In other words, a method of using the sheet metal parts as the ground plate and the feeder may reduce the production costs of the base station antenna.

Figure 7:
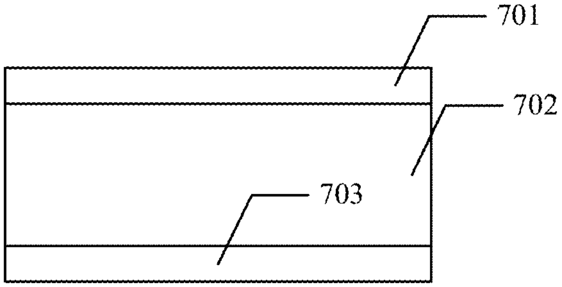
FIG. 7 is a schematic side view of a PCB according to an embodiment of this application.

In another embodiment, a design of integrating two printed circuit boards (PCBs) is used to implement the structure in which the feeding network and the balun are integrated. Referring to FIG. 7, a structure of a PCB in this application is first described. The PCB may include at least three layers, and the three layers may include a signal layer 701, a dielectric layer 702, and a ground layer 703. The signal layer 701 may be a top layer of the PCB, and is configured to deploy a polarized feeder. The dielectric layer 702 is an intermediate layer of the PCB, and is a substrate layer (or also referred to as an insulation layer) of the PCB. The ground layer 703 is configured to ground and is a metal layer.

Figure 8:
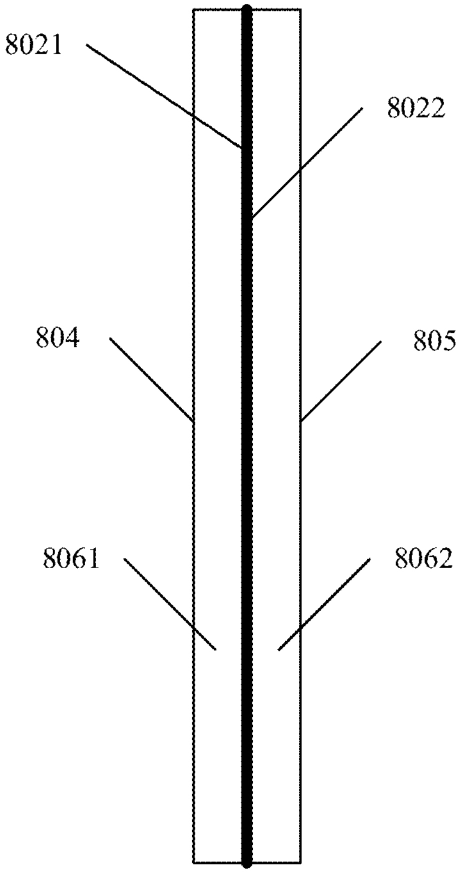
FIG. 8 is a schematic structural diagram of a side view of another example of an antenna subarray according to an embodiment of this application.

Referring to FIG. 4 and FIG. 8, the first feeder layer is a signal layer 804 of a first PCB, and the second feeder layer is a signal layer 805 of a second PCB. The ground plate (the "common ground") includes a ground layer 8021 of the first PCB and a ground layer 8022 of the second PCB, and the ground layer 8021 of the first PCB is connected to the ground layer 8022 of the second PCB. The first dielectric layer is a dielectric layer 8061 of the first PCB, and the second dielectric layer is a dielectric layer 8062 of the second PCB.

It may be understood that the ground layer of the first PCB and the ground layer of the second PCB jointly implement a function of the "common ground". To be specific, the ground layers of the two PCBs can implement both a "ground" function of the polarized feeder and a "ground" function of a balun of a radiating element. The first polarized feeder may be deployed at the signal layer of the first PCB, and the second polarized feeder may be deployed at the signal layer of the second PCB. In other words, the first polarized feeder and the second polarized feeder are respectively located on two sides of the "common ground". The first polarized feeder and the second polarized feeder may not only serve as feeders of the radiation surface to feed the radiation surface, but also implement a function of a balun feeder. This can balance feeding to a plurality of radiating elements. In this example, a structure in which a feeding network and the balun that are of the base station antenna are integrated is implemented by using a structure of two PCBs. The structure is simple and installation is convenient. In this example, the PCB structure is used to implement a structure of the "common ground", the first polarized feeder, and the second polarized feeder. Therefore, advantages such as convenient processing and lightweight are implemented.

Embodiment 2

Figure 9A:
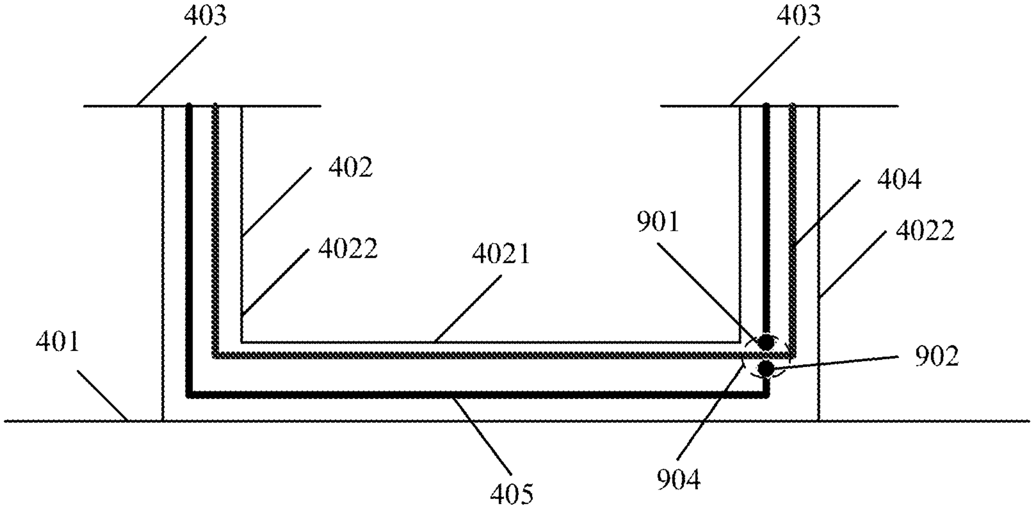
FIG. 9A is a schematic structural diagram of a front view of another example of an antenna subarray according to an embodiment of this application.
Figure 9B:
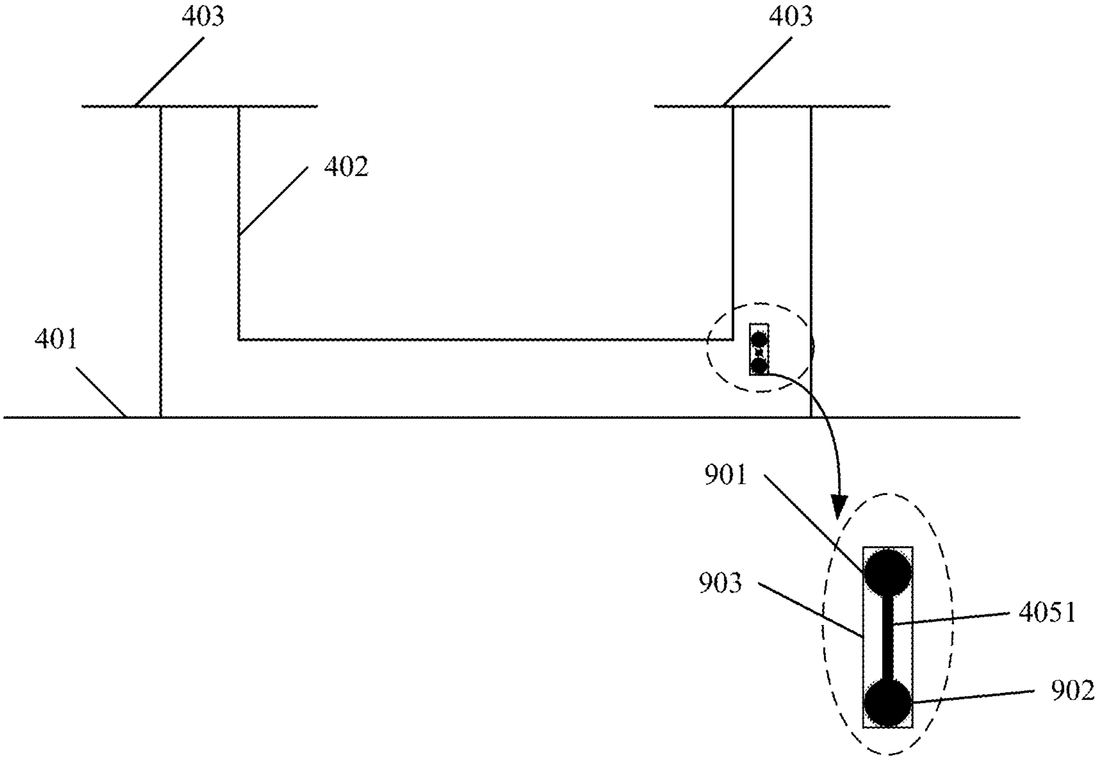
FIG. 9B is a schematic structural diagram of a rear view of another example of an antenna subarray according to an embodiment of this application.

Embodiments of this application provide another embodiment of an antenna subarray. A main difference between this embodiment and the Embodiment 1 lies in that, in the Embodiment 1, the first polarized feeder and the second polarized feeder are respectively disposed on two sides of the ground plate. In this embodiment, the first polarized feeder and the second polarized feeder are disposed on a same side of the ground plate. Referring to FIG. 9A and FIG. 9B, in this example, there are two radiation surfaces 403 for description. A base station antenna includes a reflection plate 401, a plurality of radiation surfaces 403, and a ground plate 402 (which may also be referred to as a "common ground"). The ground plate 402 is vertically disposed on the reflection plate 401. The ground plate 402 includes an integrated bottom end structure 4021 and a plurality of branch structures 4022 (for example, there are two branch structures in this example). The bottom end structure 4021 may be connected to the reflection plate 401 via a screw. A top end of a branch structure 4022 is connected to a radiation surface 403, and the top end of each branch structure 4022 is connected to one radiation surface 403. A feeder layer is disposed on a same side of the ground plate 402, and a first polarized feeder 404 and a second polarized feeder 405 are deployed on the feeder layer.

In this example, the "common ground" and functions of the first polarized feeder 404 and the second polarized feeder 405 may be implemented by using a PCB structure. The ground plate 402 (the common ground) is a ground layer of the PCB, the feeder layer is a signal layer of the PCB, and a dielectric layer is a dielectric layer of the PCB. In this example, both the first polarized feeder 404 and the second polarized feeder 405 are disposed at the signal layer of the PCB. To avoid a cross electrical connection between the first polarized feeder 404 and the second polarized feeder 405, the first polarized feeder 404 and the second polarized feeder 405 are disposed on the same side of the "common ground" in a manner of cross jumpers. For example, on one side of the dielectric layer, the first polarized feeder 404 and the second polarized feeder 405 have an intersection position 904, and a window 903 is disposed on the other side of the dielectric layer (the signal layer of the PCB), in other words, a corresponding position of the intersection position 904. The window 903 is configured to dispose a "jumper section 4051" of the second polarized feeder 405, and the "jumper section 4051" means a feeder section of the second polarized feeder 405 at the "intersection position 904". Refer to FIG. 9A again. The first polarized feeder 404 and the second polarized feeder 405 are connected to two radiation surfaces 403. Therefore, the first polarized feeder 404 and the second polarized feeder 405 are of a "concave" structure. The first polarized feeder 404 and the second polarized feeder 405 each include two vertical feeder sections and one horizontal feeder section. A first via 901 and a second via 902 are disposed on the PCB (for example, in one branch structure), and a distance between the first via 901 and the second via 902 is greater than or equal to a width of the first polarized feeder 404. The horizontal feeder section of the first polarized feeder 404 is located at the intersection position 904, and is located between the first via 901 and the second via 902. Refer to FIG. 9B. The second polarized feeder 405 passes through the first via 901, and exits from the second via 902. To be specific, the "jumper section 4051" of the second polarized feeder 405 passes through the first via 901 and the second via 902 and is located at the window 903 of the ground layer of the PCB.

In this example, the ground layer of the PCB is configured to implement a function of the "common ground", and can implement both a "ground" function of a polarized feeder and a "ground" function of a balun of a radiating element. The first polarized feeder and the second polarized feeder may implement a function of a feeder of a radiation surface and a function of a balun feeder. In this example, the first polarized feeder and the second polarized feeder may be disposed on the same side of the ground plate in a manner of cross jumpers. Therefore, a structure in which the feeding network and the balun are integrated is implemented, the structure of the base station antenna is simple, and the installation is convenient. In this example, the PCB structure is used to implement a structure of the "common ground", the first polarized feeder, and the second polarized feeder. Therefore, advantages such as convenient processing and lightweight are implemented.

In embodiments of this application, referring to FIG. 4 again, the radiation surface may include four ring structures. A first ring structure and a third ring structure thereof are first electric dipoles (for example, +45° electric dipoles). A second ring structure and a fourth ring structure thereof are second electric dipoles (for example, −45° electric dipoles). The four ring structures are connected by using an element placed in a cross manner. When one dipole is excited to work, the other orthogonally placed dipole serves as a parasitic element to broaden an impedance bandwidth, in other words, generate a new resonance frequency. Each ring structure is a radiation arm of the radiation surface, and the radiation arm of the radiation surface is implemented by using the ring structure. An induced current on the radiation arm is symmetric around a center of the element, and there is no potential difference between two feeds of the element. This implements high isolation.

It may be understood that a shape of the radiation arm of the radiation surface is merely an example for description, and a specific shape of the radiation arm is not limited in this application.

In embodiments of this application, the first polarized feeder may be further connected to a first polarized signal input point, and a signal is input to the first polarized feeder via the first polarized signal input point. The second polarized feeder is further connected to a second polarized signal input point, and a signal is input to the second polarized feeder via the second polarized signal input point.

Optionally, the radiation surface may alternatively be a sheet metal part. A radiating element of a sheet metal part structure has a stable structure and a long service life. In addition, a structure in which the radiation surface is the sheet metal part may reduce costs of the antenna subarray. Optionally, the radiation surface may alternatively be a PCB structure. The structure of the radiation surface is implemented by using the PCB structure, having advantages such as convenient processing and lightweight.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An antenna subarray, comprising a reflection plate, a plurality of radiation surfaces, and a ground plate of the plurality of radiation surfaces, wherein the ground plate is vertically disposed on the reflection plate, and comprises an integrated bottom end structure and a plurality of branch structures; the bottom end structure is connected to the reflection plate, and a top end of a branch structure is connected to a radiation surface; a feeder layer is disposed on a side of the ground plate, and a dielectric layer is disposed between the ground plate and the feeder layer; the feeder layer is configured to dispose a first polarized feeder and a second polarized feeder; the radiation surface comprises a first electric dipole and a second electric dipole that are disposed in a crossed manner; and the first polarized feeder is connected to the first electric dipole, and the second polarized feeder is connected to the second electric dipole, wherein the feeder layer comprises a first feeder layer and a second feeder layer, and the dielectric layer comprises a first dielectric layer and a second dielectric layer; the first feeder layer is disposed on one side of the ground plate, and is configured to dispose the first polarized feeder; and the second feeder layer is disposed on another side of the ground plate, and is configured to dispose the second polarized feeder.

2. The antenna subarray according to claim 1, wherein the ground plate, the first polarized feeder, and the second polarized feeder are all sheet metal parts.

3. The antenna subarray according to claim 1, wherein the dielectric layer is an air dielectric layer; and a dielectric layer between the ground plate and the first feeder layer is a first air dielectric layer, and a dielectric layer between the ground plate and the second feeder layer is a second air dielectric layer.

4. The antenna subarray according to claim 1, wherein the first feeder layer is a signal layer of a first printed circuit board (PCB), and the second feeder layer is a signal layer of a second PCB; and the ground plate comprises a ground layer of the first PCB and a ground layer of the second PCB.

5. The antenna subarray according to claim 4, wherein the first dielectric layer is a dielectric layer of the first PCB, and the second dielectric layer is a dielectric layer of the second PCB.

6. The antenna subarray according to claim 1, wherein the feeder layer is disposed on a same side of the ground plate, the ground plate is a ground layer of a printed circuit board (PCB), the feeder layer is a signal layer of the PCB, and the dielectric layer is a dielectric layer of the PCB; a first via and a second via are disposed on the PCB; a window is disposed in a position that is on the ground layer of the PCB and that corresponds to the first via and the second via; a distance between the first via and the second via is greater than or equal to a width of the first polarized feeder; and the second polarized feeder comprises a jumper section, and the jumper section passing through the first via and the second via is located in the position of the window.

7. The antenna subarray according to claim 1, wherein the radiation surface comprises four ring structures, a first ring structure and a third ring structure thereof are first electric dipoles, and a second ring structure and a fourth ring structure thereof are second electric dipoles.

8. The antenna subarray according to claim 1, wherein the radiation surface is a sheet metal part, or the radiation surface is a printed circuit board (PCB) structure.

9. A base station antenna, comprising a radome, wherein the radome comprises a plurality of antenna subarrays according to claim 1.

10. An antenna subarray, comprising a reflection plate, a plurality of radiation surfaces, and a ground plate of the plurality of radiation surfaces, wherein the ground plate is vertically disposed on the reflection plate, and comprises an integrated bottom end structure and a plurality of branch structures; the bottom end structure is connected to the reflection plate, and a top end of a branch structure is connected to a radiation surface; a feeder layer is disposed on a side of the ground plate, and a dielectric layer is disposed between the ground plate and the feeder layer; the feeder layer is configured to dispose a first polarized feeder and a second polarized feeder; the radiation surface comprises a first electric dipole and a second electric dipole that are disposed in a crossed manner; and the first polarized feeder is connected to the first electric dipole, and the second polarized feeder is connected to the second electric dipole, wherein the dielectric layer is an air dielectric layer; and a dielectric layer between the ground plate and the first feeder layer is a first air dielectric layer, and a dielectric layer between the ground plate and the second feeder layer is a second air dielectric layer.

11. An antenna subarray, comprising a reflection plate, a plurality of radiation surfaces, and a ground plate of the plurality of radiation surfaces, wherein the ground plate is vertically disposed on the reflection plate, and comprises an integrated bottom end structure and a plurality of branch structures; the bottom end structure is connected to the reflection plate, and a top end of a branch structure is connected to a radiation surface; a feeder layer is disposed on a side of the ground plate, and a dielectric layer is disposed between the ground plate and the feeder layer; the feeder layer is configured to dispose a first polarized feeder and a second polarized feeder; the radiation surface comprises a first electric dipole and a second electric dipole that are disposed in a crossed manner; and the first polarized feeder is connected to the first electric dipole, and the second polarized feeder is connected to the second electric dipole, wherein the radiation surface comprises four ring structures, a first ring structure and a third ring structure thereof are first electric dipoles, and a second ring structure and a fourth ring structure thereof are second electric dipoles.

* * * * *